(12) United States Patent
Madhavan et al.

(10) Patent No.: US 9,432,440 B2
(45) Date of Patent: Aug. 30, 2016

(54) METHOD OF CONTENT DELIVERY IN LTE RAN, AN ENB AND COMMUNICATION SYSTEM

(71) Applicant: Huawei Technologies Co., Ltd., Shenzhen, Guangdong (CN)

(72) Inventors: Sreekanth Madhavan, Bangalore (IN); Ravi Shankar Nandiraju, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 14/143,326

(22) Filed: Dec. 30, 2013

(65) Prior Publication Data

US 2014/0342712 A1 Nov. 20, 2014

Related U.S. Application Data

(63) Continuation of application No. PCT/CN2013/086650, filed on Nov. 6, 2013.

(30) Foreign Application Priority Data

May 16, 2013 (IN) .................. IN2166/CHE/2013

(51) Int. Cl.
*H04L 29/06* (2006.01)
*H04L 29/08* (2006.01)

(52) U.S. Cl.
CPC ........... *H04L 67/06* (2013.01); *H04L 67/2842* (2013.01)

(58) Field of Classification Search
CPC ................... H04W 72/0446; H04W 72/0433; H04W 76/046; H04W 56/0045
USPC ..................................................... 455/452.1
See application file for complete search history.

(56) References Cited

U.S. PATENT DOCUMENTS 8,111,630 B2 2/2012 Kovvali et al.
2008/0130580 A1 6/2008 Chaponniere et al.
(Continued)

FOREIGN PATENT DOCUMENTS

CN 101686224 A 3/2010
CN 101686228 A 3/2010
(Continued)

OTHER PUBLICATIONS

Hasti Ahlehagh, et al., "Hierarchical Video Caching in Wireless Cloud: Approaches and Algorithms", Realizing Advanced Video Optimized Wireless Networks, Jun. 10, 2012, p. 7082-7087.
(Continued)

*Primary Examiner* — Shahriar Behnamian

(57) ABSTRACT

The embodiments of the present invention provide a method of content delivery in LTE RAN, an eNB and communication system. The method includes: receiving, by an eNB from an UE, a client request for requesting content data; checking a segment map according to the client request; acquiring the plurality of segments from one or more eNBs of the RAN according to the index information in the segment map; generating the content data by using the plurality of segments; sending the content data to the UE. In this invention, a content data is divided into a plurality of segments and the segments are distributed in a RAN. Furthermore, the content data is acquired from neighboring nodes of RAN as much as possible, such that cache hit ratio is improved and the link between RAN and CN is saved.

15 Claims, 15 Drawing Sheets

(56) References Cited

U.S. PATENT DOCUMENTS

| | | | |
|---|---|---|---|
| 2009/0168750 A1* | 7/2009 | Pelletier | H04W 52/50 370/350 |
| 2009/0291696 A1* | 11/2009 | Cortes | H04W 4/00 455/466 |
| 2010/0061444 A1 | 3/2010 | Wilkins et al. | |
| 2011/0136488 A1 | 6/2011 | Kuvvali et al. | |
| 2011/0158205 A1* | 6/2011 | Niemasz, Jr. | H04B 7/0669 370/336 |
| 2014/0010161 A1 | 1/2014 | Jeong et al. | |

FOREIGN PATENT DOCUMENTS

| | | |
|---|---|---|
| CN | 102088389 A | 6/2011 |
| KR | 10-2011-0003539 | 1/2011 |
| KR | 20110056388 A | 5/2011 |
| KR | 10-2012-0016168 | 2/2012 |
| KR | 20120105958 A | 9/2012 |
| WO | WO 2012/139016 A2 | 10/2012 |
| WO | WO 2013/004261 A1 | 1/2013 |

OTHER PUBLICATIONS

"Architectural Considerations for Backhaul of 2G/3G and Long Term Evolution Networks", Cisco, 2010, 19 pages.

Hasti Ahlehagh, et al., "Video Caching in Radio Access Network: Impact on Delay and Capacity", 2012 IEEE Wireless Communications and Networking Conference: Mobile and Wireless Networks, p. 2276-2281.

* cited by examiner

METHOD OF CONTENT DELIVERY IN LTE RAN, AN ENB AND COMMUNICATION SYSTEM

CROSS-REFERENCE TO RELATED APPLICATIONS

This application is a continuation of International Application No. PCT/CN2013/086650, filed on Nov. 6, 2013, which claims priority to Indian Patent Application No. IN2166/CHE/2013, filed with the Indian Patent Office on May 16, 2013 and entitled "A METHOD OF CONTENT DELIVERY IN LTE RAN, AN eNB AND COMMUNICATION SYSTEM", all of which are hereby incorporated by reference in their entireties.

TECHNICAL FIELD

This application relates to communication technology, in particular to a method of content delivery in LTE (Long Term Evolution) RAN (Radio Access Network), an eNB and communication system.

BACKGROUND

Nowadays, the access to Internet content data (such as video, audio) has increased significantly due to the adoption to smart phones and tablets. When Internet video is accessed by a mobile device (it also could be called UE, User Equipment), the video has to be fetched from the servers of a CDN (Content Delivery Network).

CDNs are used to help reduce Internet bandwidth consumption and associated delay/jitter. Thereby the quality of experience is improved. CDN system has evolved wherein caches are placed at a RAN (Radio Access Network) and most of video requests can be served from caches of the RAN instead of having to be fetched from the Internet CDNs.

FIG. 1 is a topology diagram showing a structure of CDN deployment. As shown in FIG. 1, caches are placed at a CN (Core Network) and also nodes of the RAN.

The existing approach (as shown in FIG. 1) enables caching of videos at the edge of the RAN such that most video request can be served from the caches of RAN, instead of having to be fetched from the Internet CDNs. This will lead to thousands of caches, wherein each RAN node has a cache having smaller size.

Theses caches serve video request without requiring the traffic to be routed via the CN. If cache miss happens on RAN (such as in an eNB), data will be fetched from next level, such as a P-GW (Packet GateWay) in the CN or a SP (Service Provider) in the CDN.

However, the applicant found that: the content data (such as video) must additionally travel through the wireless carrier CN and RAN before reaching the mobile device. Besides adding to video latency, bringing each requested video from the Internet CDNs can put significant strain on the carrier's CN and RAN backhaul. This will lead to congestion, significant delay, and constraint on the network's capacity to serve large number of concurrent video requests.

The main issues with the current approach are: RAN caches can store only thousands of videos as compared to much larger sized caches used in internet CDNs which can store millions of videos, thereby affecting cache hit ratio. In some scenario, RAN cache miss happens while the required data may be present in neighboring nodes. However, the data needs to be retrieved from CN or Internet CDNs which adds strain on carrier's CN and RAN backhaul.

SUMMARY

Embodiments of the present invention pertain to a method of content delivery in LTE RAN, an eNB and communication system. The object of the invention is to acquire content data from neighboring nodes of RAN as much as possible, such that cache hit ratio is improved and the link between RAN and CN is saved.

According a first aspect of the embodiments of the present invention, a method of content delivery in LTE RAN is provided, the method includes:

receiving, by an eNB from an UE, a client request for requesting content data;

checking, by the eNB, a segment map according to the client request; wherein the segment map is configured to store index information of the content data which is divided into a plurality of segments; the segments are distributed in a RAN (Radio Access Network);

acquiring the plurality of segments from one or more eNBs of the RAN according to the index information in the segment map;

generating the content data by using the plurality of segments;

sending, by the eNB to the UE, the content data.

According to another aspect of the embodiments of the present invention, wherein the method further includes:

acquiring, by the eNB, one or more segments from a CN (Core Network) or a CDN (Content Delivery Network) if the one or more segments are not placed in the RAN.

According to another aspect of the embodiments of the present invention, wherein the method further includes:

receiving, by the eNB from the UE, an UGC (User Generated Content) request for uploading content data;

checking, by the eNB, the segment map according to the UGC request;

sending, by the eNB, a plurality of segments of the content data to one or more eNBs of the RAN separately.

According to another aspect of the embodiments of the present invention, wherein the method further includes:

updating the segment map according to the result of uploading.

According to another aspect of the embodiments of the present invention, wherein the method further includes:

pushing, by the eNB to a target eNB, context information corresponding to the client request or the UGC request if the UE is handed over from the eNB to the target eNB.

According to another aspect of the embodiments of the present invention, wherein the context information includes a plurality of TCP (Transmission Control Protocol) parameters.

According a second aspect of the embodiments of the present invention, an eNB is provided, the eNB includes:

a first receiving unit, configured to receive a client request for requesting content data from an UE;

a first checking unit, configured to check a segment map according to the client request; wherein the segment map is configured to store index information of the content data which is divided into a plurality of segments; the segments are distributed in a RAN;

an acquiring unit, configured to acquire the plurality of segments from one or more eNBs of the RAN according to the index information in the segment map;

a generating unit, configured to generate the content data by using the plurality of segments;

a first sending unit, configured to send the content data to the UE.

According to another aspect of the embodiments of the present invention, wherein the acquiring unit is further configured to acquire one or more segments from a CN or a CDN if the one or more segments are not placed in the RAN.

According to another aspect of the embodiments of the present invention, wherein the eNB further includes:

a second receiving unit, configured to receive an UGC request for uploading content data from the UE;

a second checking unit, configured to check the segment map according to the UGC request;

a second sending unit, configured to send a plurality of segments of the content data to one or more eNBs of the RAN separately.

According to another aspect of the embodiments of the present invention, wherein the eNB further includes:

an updating unit, configured to update the segment map according to the result of uploading.

According to another aspect of the embodiments of the present invention, wherein the eNB further includes:

a pushing unit, configured to push context information corresponding to the client request or the UGC request to a target eNB if the UE is handed over from the eNB to the target eNB.

According a third aspect of the embodiments of the present invention, a communication system is provided, the communication system includes:

an UE, configured to download or upload content data;

one or more eNBs, configured to store the content data which is divided into a plurality of segments; the segments are distributed in the eNBs.

According to another aspect of the embodiments of the present invention, wherein the eNB is further configured to maintain a segment map which stores index information of the content data.

The advantages of the present invention exist in that: a content data is divided into a plurality of segments and the segments are distributed in a RAN. Furthermore, the content data is acquired from neighboring nodes of RAN as much as possible, such that cache hit ratio is improved and the link between RAN and CN is saved.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute apart of the specification and illustrate the embodiments of the present invention, and are used for setting forth the principles of the present invention together with the description. The same element is represented with the same reference number throughout the drawings.

In the drawings.

DETAILED DESCRIPTION

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The embodiments of the present invention are described as follows in reference to the drawings.

Embodiment 1

This embodiment of the present invention provides a method of content delivery in LTE RAN.

Figure 1:
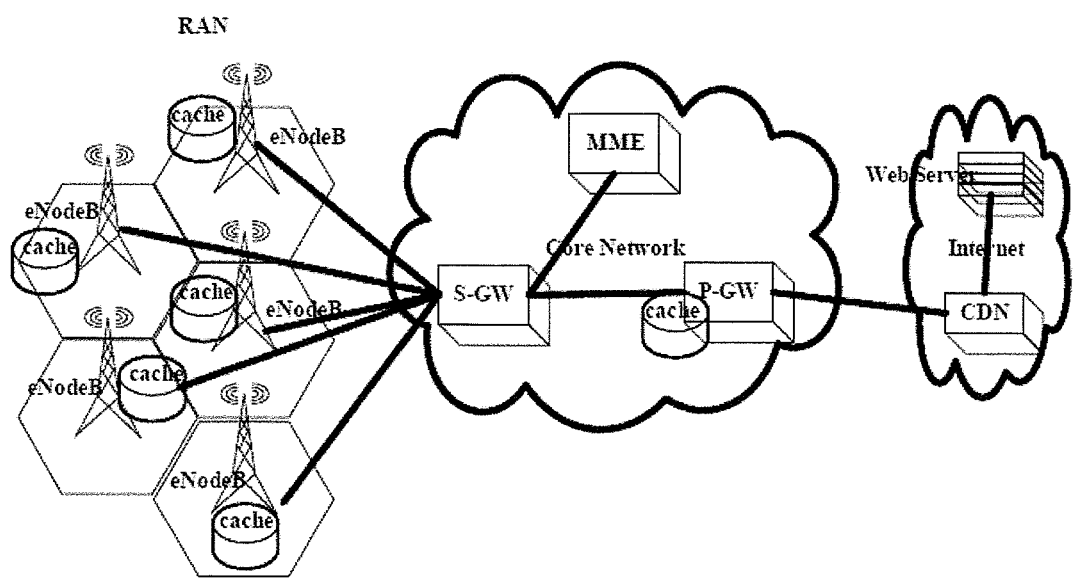
FIG. 1 is a topology diagram showing a structure of CDN deployment.
Figure 2:
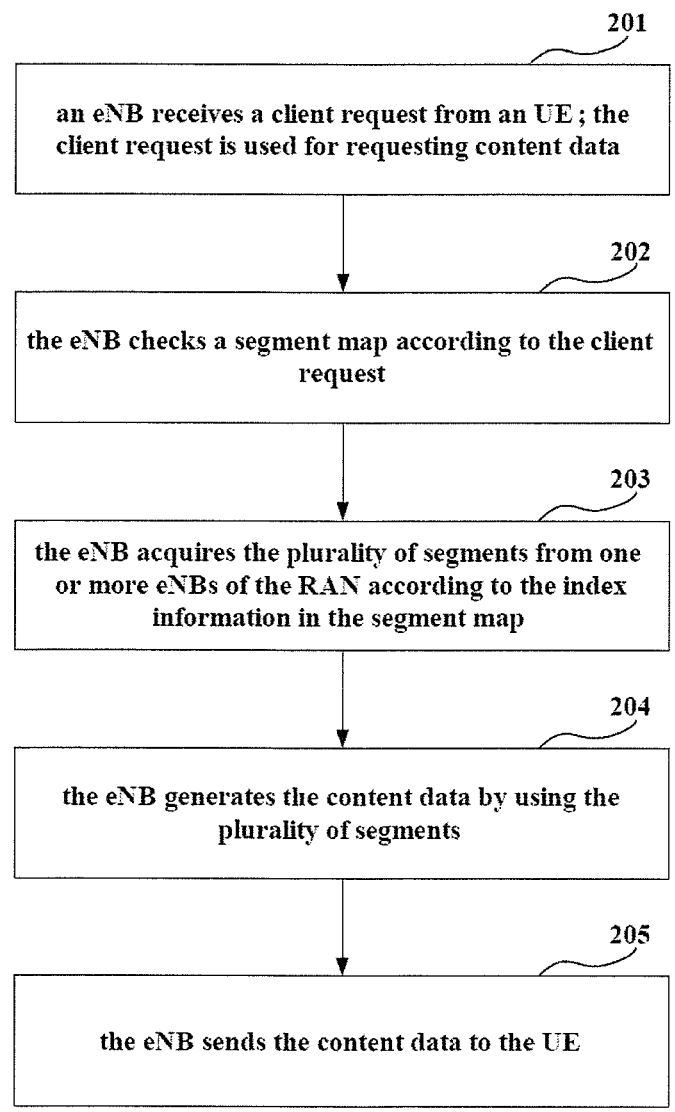
FIG. 2 is a flowchart of the method of content delivery in LTE RAN in accordance with embodiment 1 of the present invention.

FIG. 2 is a flowchart of the method of content delivery in LTE RAN in accordance with an embodiment of the present invention, as shown in FIG. 2, the method includes:

Step 201, an eNB receives a client request from an UE; the client request is used for requesting content data;

Step 202, the eNB checks a segment map according to the client request;

Wherein, the segment map is configured to store index information of the content data which is divided into a plurality of segments; the segments are distributed in a RAN;

Step 203, the eNB acquires the plurality of segments from one or more eNBs of the RAN according to the index information in the segment map;

Step 204, the eNB generates the content data by using the plurality of segments;

Step 205, the eNB sends the content data to the UE.

In the embodiment, content data (such as video, audio) is divided into a plurality of segments (such as M equal segments, each segment has fixed duration). Those segments are distributed in several nodes (the node also can be called eNB or eNodeB) in a RAN. Such that managed overlay is created, wherein content data is placed not at some random nodes but at some specific locations.

In the embodiment, all the nodes in the RAN may be managed by a single MME (Mobile Management Entity). Each node may be part of a cooperative system. There is a RAN based cooperative streaming where each node contributes a part of its storage to build up this distributed cooperative cache. Thereby the segments are exchanged based on the content data.

In this embodiment, each node (peer) may maintain a segment map which contains the peer index information of all segments based on storage cache contents. Each node may manage the segment map respectively, such as updates the segment map when other node joins or leaves the cooperative system.

As for the detail about how to manage the overlay, it can be realized using chord with full finger table or O(1) DHT algorithms. However, it is not limited thereto, and particular method may be determined as actually required.

Figure 3:
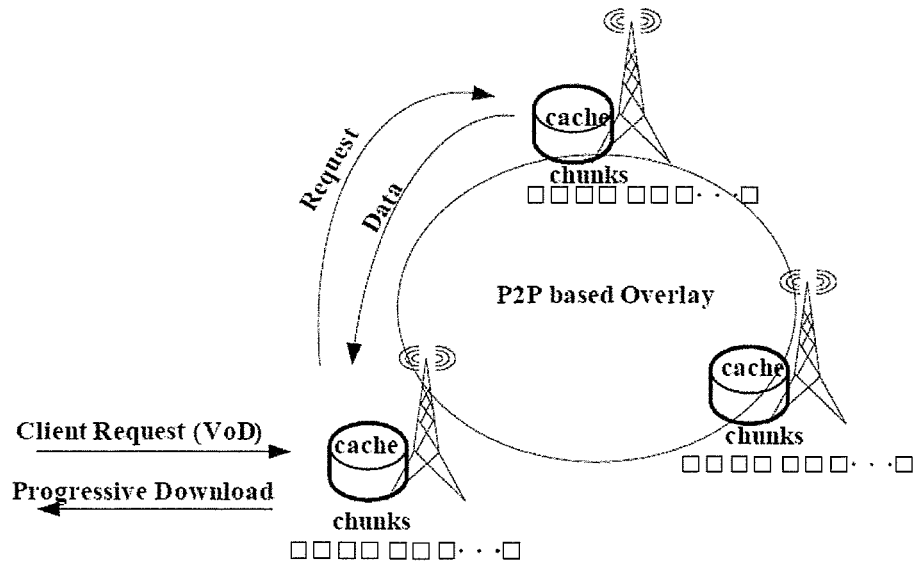
FIG. 3 is a topology diagram showing content data is distributed in several nodes of a RAN.

FIG. 3 is a topology diagram showing content data is distributed in several nodes of a RAN. As shown in FIG. 3, there are some segments (or chunks) for content data; those chunks are distributed in several nodes (peers) such that P2P (Peer to Peer) based overlay is created.

As shown in FIG. 3, when an eNB receives a client request (VoD), the eNB may request some segments from other nodes. Thereby the UE may download the content data from the eNB.

In this embodiment, the method may further include: if the one or more segments are not placed in the RAN, the eNB may acquire one or more segments from the CN or the CDN.

Figure 4:
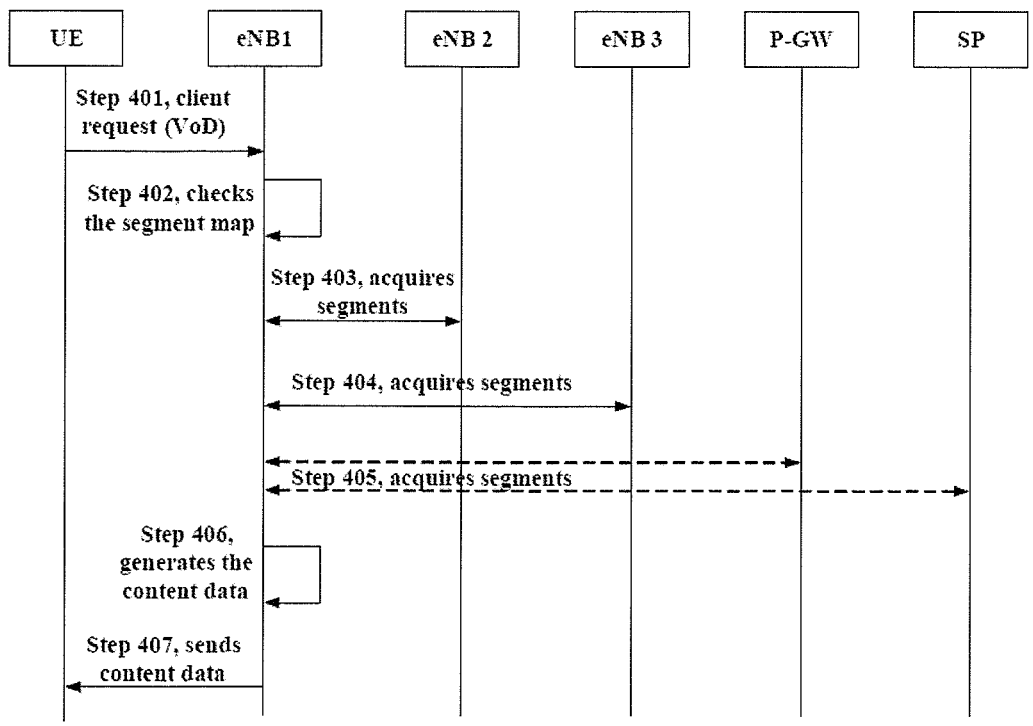
FIG. 4 is another flowchart of the method of content delivery in LTE RAN in accordance with embodiment 1 of the present invention.

FIG. 4 is another flowchart of the method of content delivery in LTE RAN in accordance with an embodiment of the present invention. As shown in FIG. 4, there are three eNBs (eNB 1, eNB 2 and eNB 3) of the RAN, an UE, a P-GW of the CN and a SP of the CDN. Wherein some segments of content data are distributed in the RAN and a cooperative system is formed among eNB 1, eNB 2 and eNB 3.

As shown in FIG. 4, the method includes

Step 401, the eNB 1 receives a client request from the UE;

Step 402, the eNB 1 checks the segment map according to the client request.

In this embodiment, the peer information (such as index information) for the content data can be known by checking the segment map. For example, there are seven segments (A-G) for the content data; wherein three segments (A, C, D) are placed in the eNB 1, two segments (B, F) are placed in the eNB 2 and two segments (E, G) are placed in the eNB 3, Step 403, the eNB 1 acquires the segments from the eNB 2;

Step 404, the eNB 1 acquires the segments from the eNB 3; In this embodiment, if one or more segments are not placed in the RAN, the eNB may acquire the segments from the CN or the CDN. For example, there is an optional step 405 if the segment D is not placed in the RAN.

Step 405, the eNB 1 acquires the segments from the P-GW of the CN or the SP of the CDN.

Step 406, the eNB 1 generates the content data by using the plurality of segments;

In this embodiment, for example, the eNB 1 acquires the two segments (B, F) from the eNB 2, the two segments (E, G) from the eNB 3 and acquires three segments (A, C, D) from itself (or, the segment D is acquired from the P-GW or SP). Then the eNB 1 uses the seven segments (A-G) to generate the content data.

Step 407, the eNB 1 sends the content data to the UE.

In this embodiment, eNB retrieves few chunks from several neighboring nodes (in a P2P fashion) using the low bandwidth links. This saves the S1 link (between CN and RAN) bandwidth and hence S-GW can support more eNBs. Future LTE-Advanced networks recommend taking advantage of X2 interface for more user plane traffic.

Figure 5:
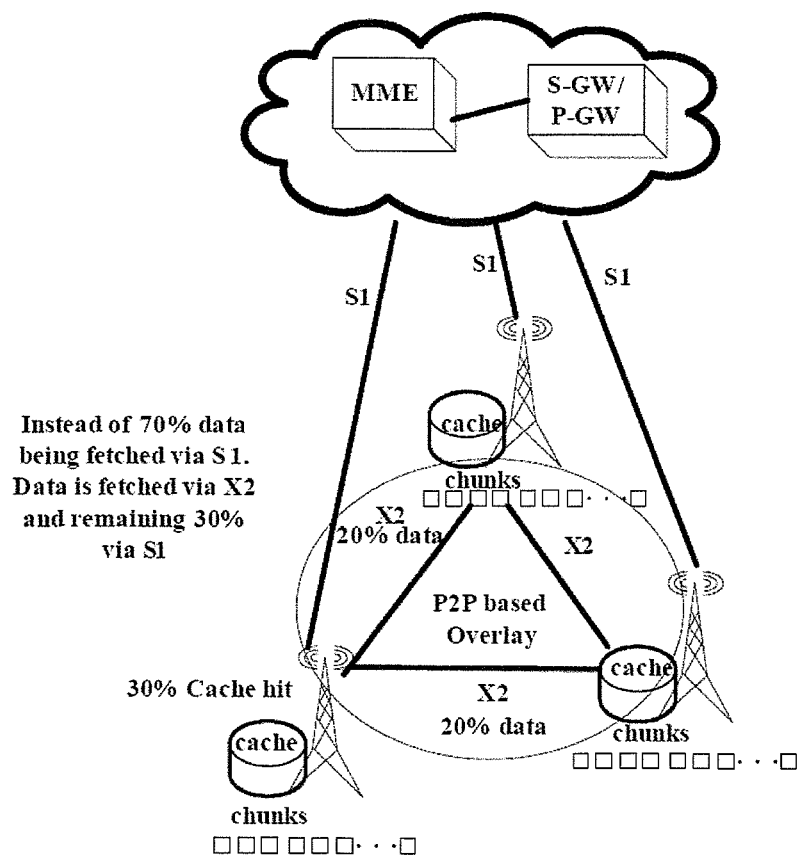
FIG. 5 is a schematic diagram showing a structure of the invention.

FIG. 5 is a schematic diagram showing a structure of the invention. As shown in FIG. 5, instead of 70% data being fetched via S1 link in the existing technology, data is fetched via X2 link as much as possible and only 30% data is fetched via S1 link in this invention. Furthermore, cache hit ratio is improved around 30%.

Figure 6:
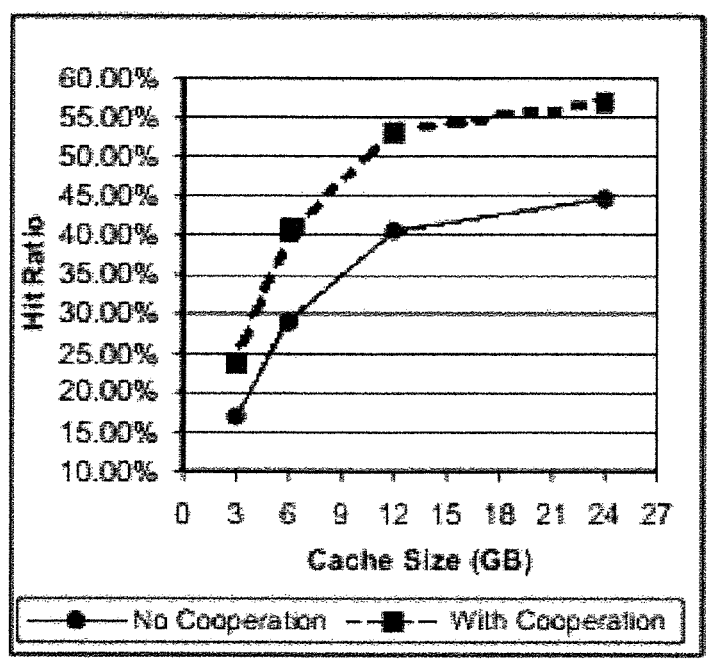
FIG. 6 is a schematic diagram showing the cache hit ratio of this invention and the existing technology.

FIG. 6 is a schematic diagram showing the cache hit ratio of this invention and the existing technology. As shown in FIG. 6, the cache hit ratio of this invention (with cooperation) is greater than the existing technology (no cooperation) obviously.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Embodiment 2

Based on the embodiment 1, this embodiment of the present invention provides a method of content delivery in LTE RAN. This embodiment focuses on uploading content data instead of downloading in embodiment 1; the same content will not be described.

Figure 7:
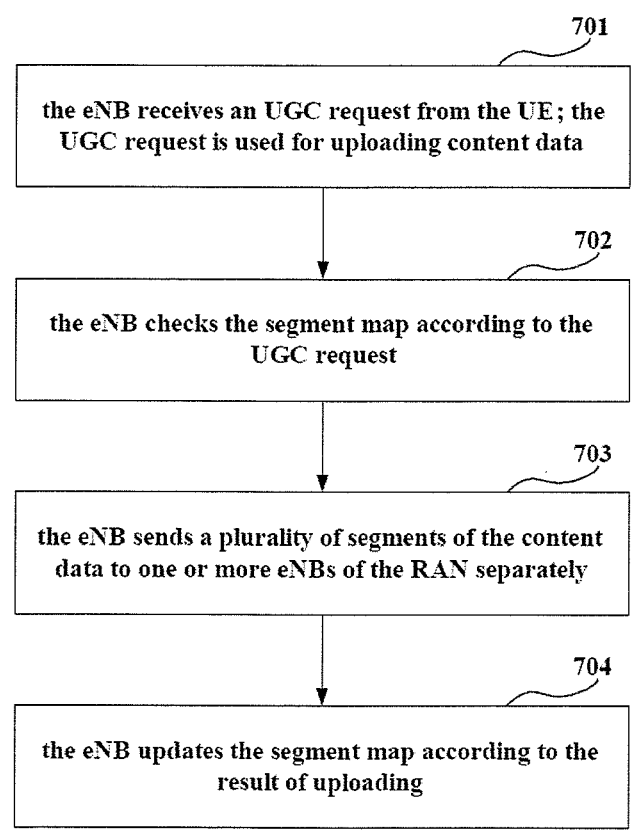
FIG. 7 is a flowchart of the method of content delivery in LTE RAN in accordance with embodiment 2 of the present invention.

FIG. 7 is a flowchart of the method of content delivery in LTE RAN in accordance with an embodiment of the present invention, as shown in FIG. 7, the method includes:

Step 701, the eNB receives an UGC (User Generated Content) request from the UE; the UGC request is used for uploading content data;

Step 702, the eNB checks the segment map according to the UGC request;

Step 703, the eNB sends a plurality of segments of the content data to one or more eNBs of the RAN separately.

As shown in FIG. 7, the method may further include:

Step 704, the eNB updates the segment map according to the result of uploading.

Figure 8:
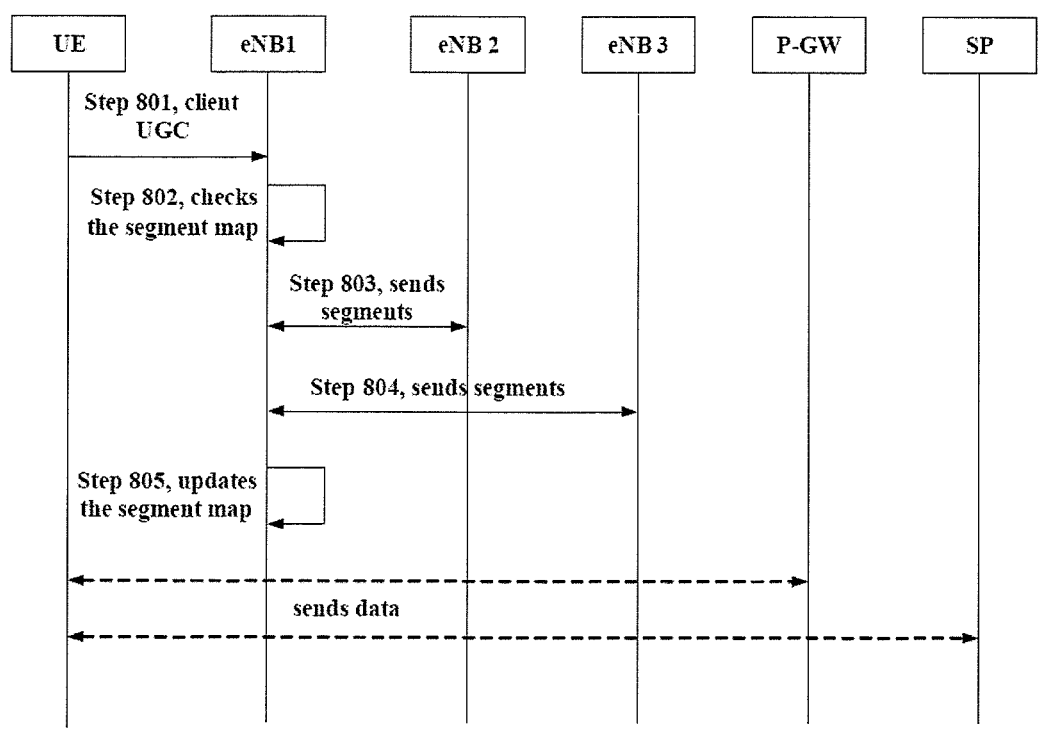
FIG. 8 is another flowchart of the method of content delivery in LTE RAN in accordance with embodiment 2 of the present invention.

FIG. 8 is another flowchart of the method of content delivery in LTE RAN in accordance with an embodiment of the present invention. As shown in FIG. 8, there are three eNBs (eNB 1, eNB 2 and eNB 3) of the RAN, an UE, a P-GW of the CN and a SP of the CDN.

As shown in FIG. 8, the method includes:

Step 801, the eNB 1 receives an UGC request from the UE;

Step 802, the eNB 1 checks the segment map according to the UGC request.

In this embodiment, content data may be contained in the UGC request and the content data can be divided into a plurality of segments. Furthermore, the eNB 1 may determine which segment should be sent to other nodes by checking the segment map.

For example, the content data may be divided into seven segments (A-G). According to the result of checking the segment map, the eNB 1 may determine that three segments (A, C, D) are placed in the eNB 1, two segments (B, F) are placed in the eNB 2 and two segments (E, G) are placed in the eNB 3.

Step 803, the eNB 1 sends the segments of the content data to the eNB 2;

Step 804, the eNB 1 sends the segments of the content data to the eNB 3;

For example, two segments (B, F) are sent to the eNB 2 and two segments (E, G) are sent to the eNB 3. Such that seven segments of the content data are distributed in the RAN.

As shown in FIG. 8, the method may further include

Step 805, the eNB 1 updates the segment map according to the result of uploading. Furthermore, the eNB 2 and eNB 3 may also update the segment map respectively.

In this embodiment, the UE may further send content data to the P-GW of CN or the SP of the CDN.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Embodiment 3

Based on the embodiment 1 and 2, this embodiment of the present invention provides a method of content delivery in LTE RAN. This embodiment focuses on a HO (Handover) scenario; the same content will not be described.

Nowadays, user mobility and seamless service continuity are other areas of concern when providing CDN service. 3GPP has defined X2 interface which connects neighboring eNBs in a P2P fashion to assist handover and provide a means for rapid coordination of radio resources.

Figure 9:
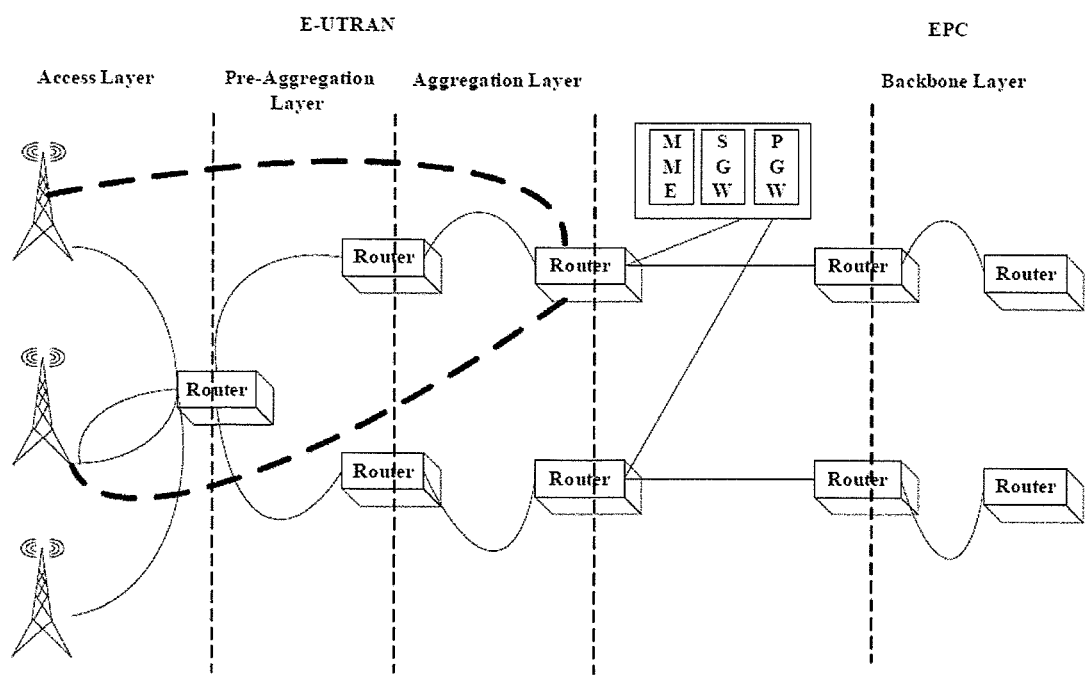
FIG. 9 is a schematic diagram showing how the handover normally happens in the existing technology.

FIG. 9 is a schematic diagram showing how the handover normally happens in the existing technology. As shown in FIG. 9, there are an E-UTRAN (Evolved Universal Terrestrial Radio Access Network) and an EPC (Evolved Packet Core). Furthermore, there are an Access Layer, a Pre-Aggregation Layer, an Aggregation Layer and a Backbone Layer. Wherein, MME, S-GW and P-GW are existed in some routers.

As shown in FIG. 9, if an UE is handed over from an eNB to another eNB when fetching content data, high cache miss ratio will happen due to user mobility. Furthermore, the UE has to fetch content data from the CN or CDN by using the S1-Handover through the Aggregation layer routers; this will add strain on carrier's CN and RAN backhaul.

In this embodiment, the method may further include: if the UE is handed over from a source eNB to a target eNB, the source eNB will push context information to the target eNB; wherein the context information corresponds to the client request or the UGC request.

Figure 10:
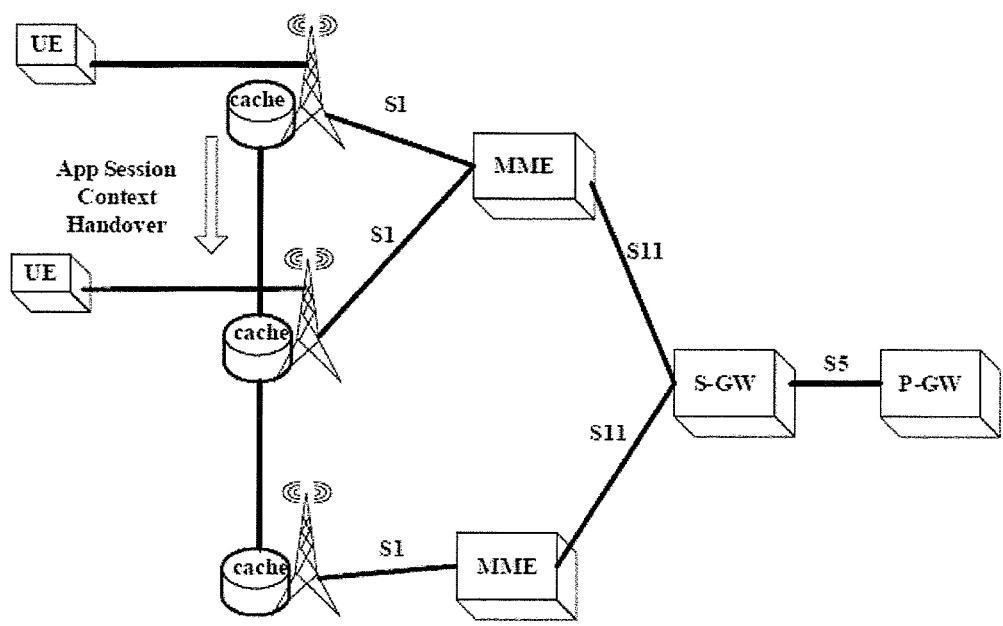
FIG. 10 is a schematic diagram showing how the handover normally happens in this invention.

FIG. 10 is a schematic diagram showing how the handover normally happens in this invention. As shown in FIG. 10, when handover happens (the UE moves out of cell area of eNB 1 and enters cell areas of eNB 2), eNB 1 will push context information (such as App-Session Context Handover) to the eNB 2.

Wherein, the context information (such as App-Session Context Handover) may include a plurality of TCP (Transmission Control Protocol) parameters, such as seqno, cwnd, SP address etc. However, it is not limited thereto, and particular content may be determined as actually required.

Figure 11:
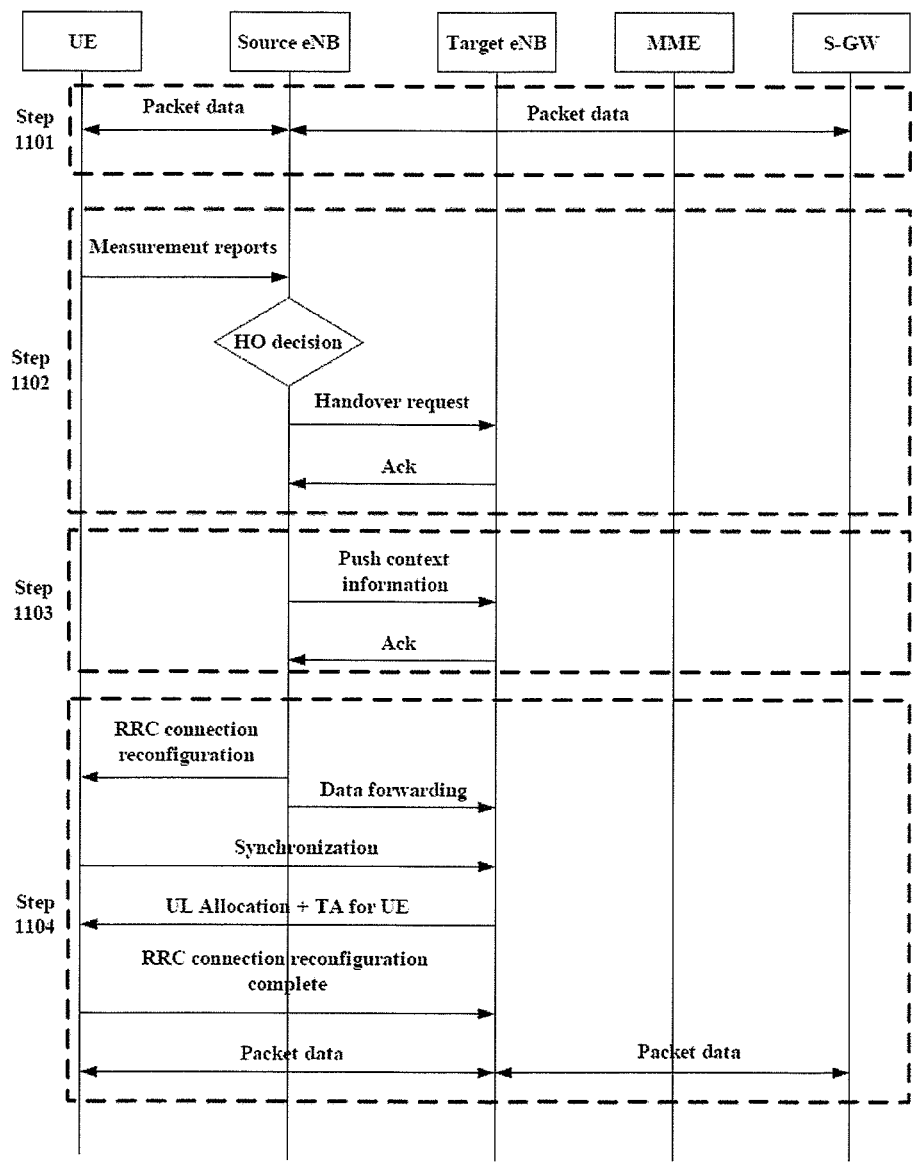
FIG. 11 is another flowchart of the method of content delivery in LTE RAN in accordance with embodiment 3 of the present invention.

FIG. 11 is another flowchart of the method of content delivery in LTE RAN in accordance with an embodiment of the present invention. As shown in FIG. 11, there are two eNBs (a source eNB and a target eNB) of the RAN, an UE, a MME and an S-GW.

As shown in FIG. 11, the method includes:

Step 1101, the UE transmits content data (packet data) with the source eNB and the S-GW.

Step 1102, the UE is handed over from the source eNB to the target eNB.

For example, the UE sends measurement reports to the source eNB; the source eNB performs HO decision; the source eNB sends a handover request to the target eNB and receives ACK.

Step 1103, the source eNB pushes context information to the target eNB.

For example, the source eNB performs App-Session Ctx Transfer, sends TCP parameters (like Seq NO, cwnd, SP address to the target eNB and receives ACK.

Step 1104, other procedure of handover is performed.

For example, RRC connection reconfiguration; data forwarding; synchronization; UL allocation+TA for UE; RRC connection reconfiguration complete, and so on.

In this embodiment, application session context handover is used to support service continuity. Handover happens using a push model wherein the source node pushes the context information to target node.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Furthermore, if the UE is handed over from a source eNB to a target eNB, the source eNB will push context information to the target eNB. Thereby, cache miss ratio is decreased even in user mobility.

Embodiment 4

This embodiment of the present invention further provides an eNB. This embodiment corresponds to the method of the above embodiment 1, and the same content will not be described.

Figure 12:
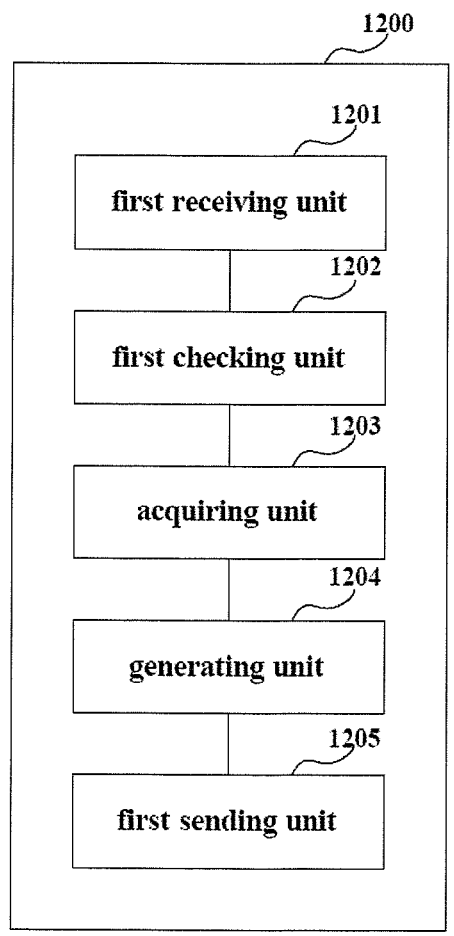
FIG. 12 is a schematic diagram of the eNB in accordance with embodiment 4 of the present invention.

FIG. 12 is a schematic diagram of the eNB in accordance with an embodiment of the present invention. As shown in FIG. 12, the eNB 1200 includes: a first receiving unit 1201, a first checking unit 1202, an acquiring unit 1203, a generating unit 1204 and a first sending unit 1205. Other parts of the eNB can refer to the existing technology and not be described in the present application. However, it is not limited thereto, and particular implement way may be determined as actually required.

Where, the first receiving unit 1201 is configured to receive a client request for requesting content data from an UE; the first checking unit 1202 is configured to check a segment map according to the client request; wherein the segment map is configured to store index information of the content data which is divided into a plurality of segments; the segments are distributed in a RAN; the acquiring unit 1203 is configured to acquire the plurality of segments from one or more eNBs of the RAN according to the index information in the segment map; the generating unit 1204 is configured to generate the content data by using the plurality of segments; the first sending unit 1205 is configured to send the content data to the UE.

In other embodiment, the acquiring unit 1204 is further configured to acquire one or more segments from a CN or a CDN if the one or more segments are not placed in the RAN.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Embodiment 5

This embodiment of the present invention further provides an eNB. This embodiment corresponds to the method of the above embodiment 2, and the same content will not be described.

Figure 13:
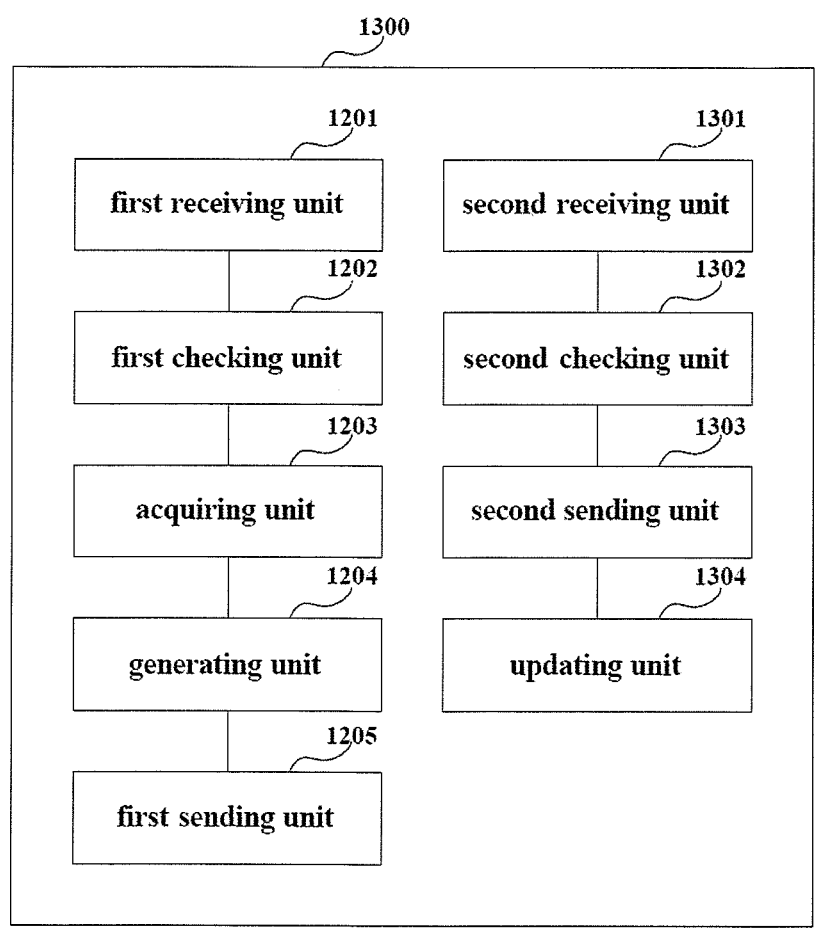
FIG. 13 is a schematic diagram of the eNB in accordance with embodiment 5 of the present invention.

FIG. 13 is a schematic diagram of the eNB in accordance with an embodiment of the present invention. As shown in FIG. 13, the eNB 1300 includes: a first receiving unit 1201, a first checking unit 1202, an acquiring unit 1203, a generating unit 1204 and a first sending unit 1205. As described in above embodiment 4.

As shown in FIG. 13, the eNB 1300 may further include: a second receiving unit 1301, a second checking unit 1302 and a second sending unit 1303.

Where, the second receiving unit 1301 is configured to receive an UGC request for uploading content data from the UE; the second checking unit 1302 is configured to check the segment map according to the UGC request; the second sending unit 1303 is configured to send a plurality of segments of the content data to one or more eNBs of the RAN separately.

As shown in FIG. 13, the eNB 1300 may further include: an updating unit 1304. The updating unit 1304 is configured to update the segment map according to the result of uploading.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Embodiment 6

This embodiment of the present invention further provides an eNB. This embodiment corresponds to the method of the above embodiment 3, and the same content will not be described.

Figure 14:
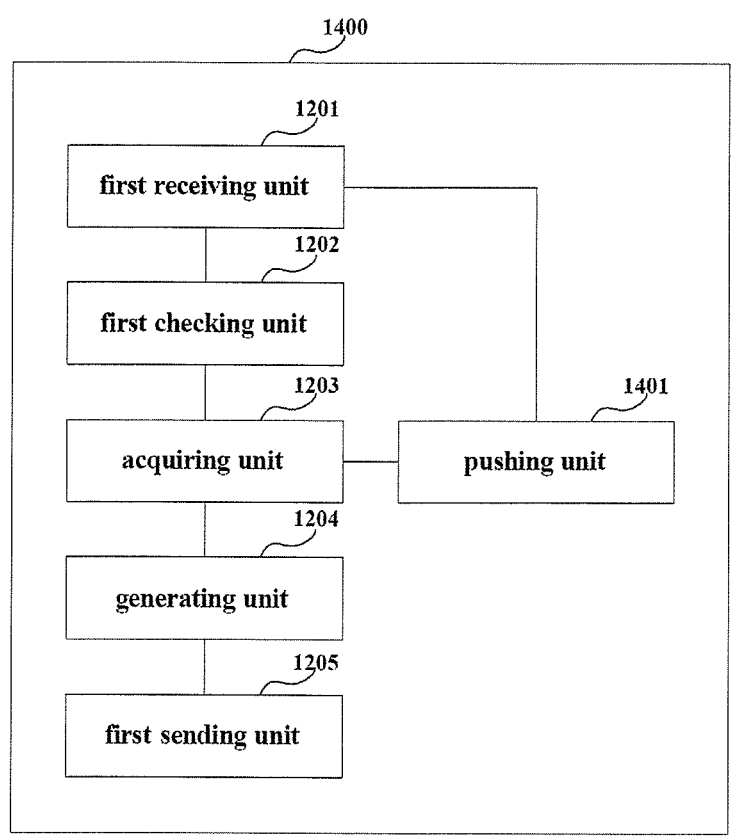
FIG. 14 is a schematic diagram of the eNB in accordance with embodiment 6 of the present invention.

FIG. 14 is a schematic diagram of the eNB in accordance with an embodiment of the present invention. As shown in FIG. 14, the eNB 1400 includes: a first receiving unit 1201, a first checking unit 1202, an acquiring unit 1203, a generating unit 1204 and a first sending unit 1205. As described in above embodiment 4.

As shown in FIG. 14, the eNB 1400 may further include: a pushing unit 1401; the pushing unit 1401 is configured to push context information corresponding to the client request or the UGC request to a target eNB, if the UE is handed over from the eNB to the target eNB.

Figure 15:
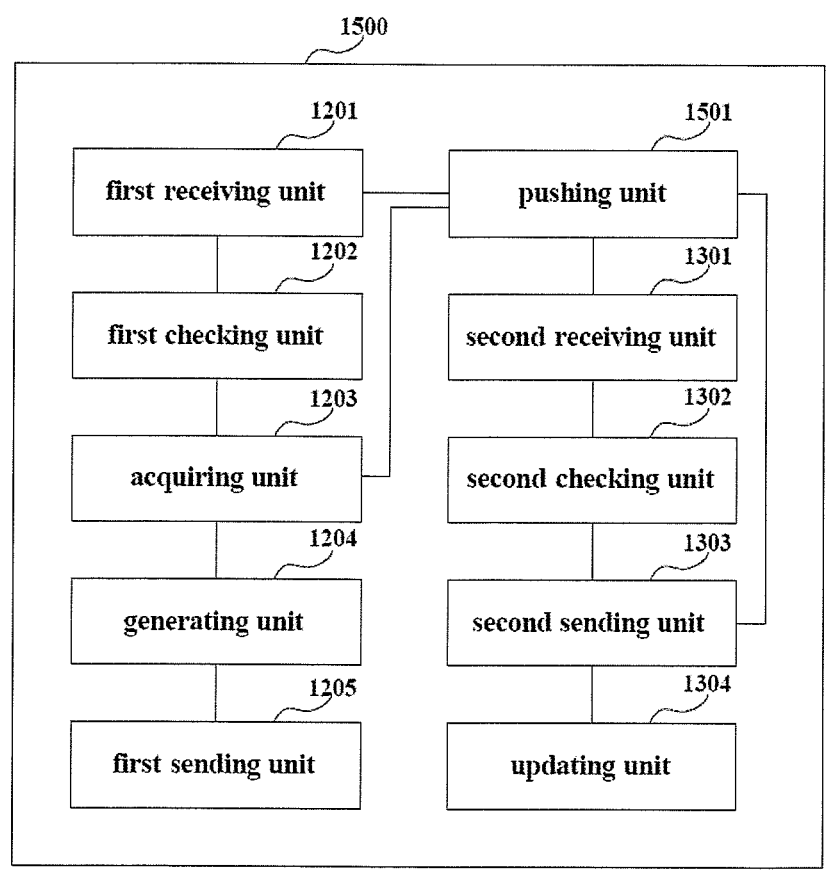
FIG. 15 is another schematic diagram of the eNB in accordance with embodiment 6 of the present invention.

FIG. 15 is another schematic diagram of the eNB in accordance with an embodiment of the present invention. As shown in FIG. 15, the eNB 1500 includes: a first receiving unit 1201, a first checking unit 1202, an acquiring unit 1203, a generating unit 1204 and a first sending unit 1205. As described in above embodiment 4.

As shown in FIG. 15, the eNB 1500 may further include: a second receiving unit 1301, a second checking unit 1302, a second sending unit 1303 and an updating unit 1304. As described in above embodiment 5.

As shown in FIG. 15, the eNB 1500 may further include: a pushing unit 1501; the pushing unit 1501 is configured to push context information corresponding to the client request or the UGC request to a target eNB, if the UE is handed over from the eNB to the target eNB.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

Furthermore, if the UE is handed over from a source eNB to a target eNB, the source eNB will push context information to the target eNB. Thereby, cache miss ratio is decreased even in user mobility.

Embodiment 7

This embodiment of the present invention further provides a communication system. This embodiment corresponds to the method of the above embodiment 1-3, and the same content will not be described.

Figure 16:
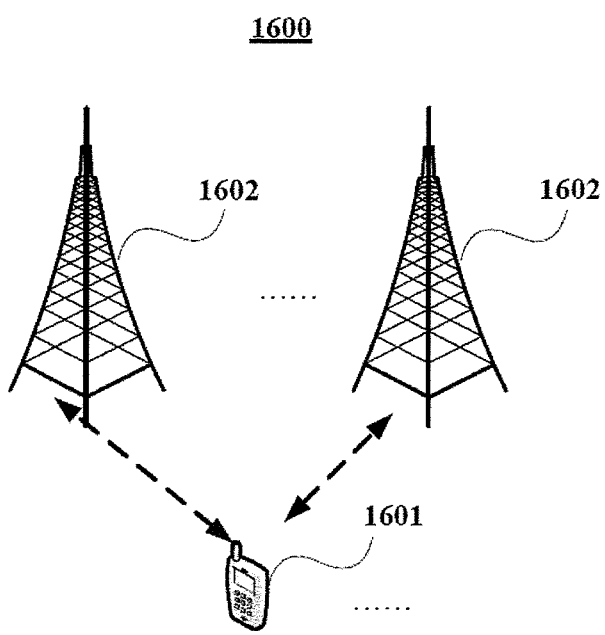
FIG. 16 is a schematic diagram of the communication system in accordance with embodiment 7 of the present invention.

FIG. 16 is a schematic diagram of the communication system in accordance with an embodiment of the present invention. As shown in FIG. 16, the communication system 1600 includes: an UE 1601 and one or more eNBs 1602. Other parts of the communication system can refer to the existing technology and not be described in the present application.

Where, the UE 1601 is configured to download a content data from the eNB 1602, or upload a content data to the eNB 1602. The eNB 1602 is configured to store the content data which is divided into a plurality of segments; the segments are distributed in the eNBs, as described in above embodiment 4-6.

Where, the eNB 1602 may be further configured to maintain a segment map which stores index information of the content data.

It can be seen from the above embodiment that: a content data is divided into a plurality of segments and the segments are distributed in a RAN. Furthermore, the content data is acquired from neighboring nodes of RAN as much as possible, such that cache hit ratio is improved and the link between RAN and CN is saved.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by anyone of the following technologies known in the art or a combination thereof as in another embodiment: a discrete logic circuit having a logic gate circuit for realizing logic functions of data signals, application-specific integrated circuit having an appropriate combined logic gate circuit, a Programmable Gate Array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular embodiment has been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A method of content delivery in a Long Term Evolution (LTE) Radio Access Network (RAN), the method comprising:
   receiving, by an evolved Node B (eNB) from a user equipment (UE), a client request for requesting content data;
   checking, by the eNB, a segment map according to the client request; wherein the segment map is configured to store index information of the content data which is divided into a plurality of segments; the segments are distributed in a plurality of eNBs of the RAN;
   acquiring, by the eNB, the plurality of segments from the plurality of eNBs of the RAN according to the index information in the segment map;
   generating, by the eNB, the content data by using the plurality of segments; and
   sending, by the eNB to the UE, the content data.

2. The method as claimed in claim 1, wherein the method further comprises:
   acquiring, by the eNB, one or more segments from a Core Network (CN) or a Content Delivery Network (CDN) if the one or more segments are not placed in the RAN.

3. The method as claimed in claim 1, wherein the method further comprises:
   receiving, by the eNB from the UE, a User Generated Content (UGC) request for uploading content data;
   checking, by the eNB, the segment map according to the UGC request;
   sending, by the eNB, a plurality of segments of the content data to the plurality of eNBs of the RAN separately.

4. The method as claimed in claim 3, wherein the method further comprises:
   updating the segment map according to the result of uploading.

5. The method as claimed in claim 1, wherein the method further comprises:
   pushing, by the eNB to a target eNB, context information corresponding to the client request if the UE is handed over from the eNB to the target eNB.

6. The method as claimed in claim 5, wherein the context information comprises a plurality of Transmission Control Protocol (TCP) parameters.

7. The method as claimed in claim 3, wherein the method further comprises:
pushing, by the eNB to a target eNB, context information corresponding to the UGC request if the UE is handed over from the eNB to the target eNB.

8. An evolved Node B (eNB), comprising:
a receiver, configured to receive a client request for requesting content data from a user equipment (UE);
a processor, configured to:
check a segment map according to the client request; wherein the segment map is configured to store index information of the content data which is divided into a plurality of segments; the segments are distributed in a plurality of eNBs of a Radio Access Network (RAN);
acquire the plurality of segments from the plurality of eNBs of the RAN according to the index information in the segment map; and
generate the content data by using the plurality of segments; and
a transmitter, configured to send the content data to the UE.

9. The eNB as claimed in claim 8, wherein the processor is further configured to acquire one or more segments from a Core Network (CN) or a Content Delivery Network (CDN) if the one or more segments are not placed in the RAN.

10. The eNB as claimed in claim 8, wherein:
the receiver is configured to receive a User Generated Content (UGC) request for uploading content data from the UE;
the processor is configured to check the segment map according to the UGC request; and
the transmitter is configured to send a plurality of segments of the content data to the plurality of eNBs of the RAN separately.

11. The eNB as claimed in claim 10, wherein the processor is configured to update the segment map according to the result of uploading.

12. The eNB as claimed in claim 8, wherein the processor is configured to push context information corresponding to the client request to a target eNB if the UE is handed over from the eNB to the target eNB.

13. The eNB as claimed in claim 10, wherein the processor is further configured to push context information corresponding to the UGC request to a target eNB if the UE is handed over from the eNB to the target eNB.

14. A communication system comprising:
a user equipment (UE), configured to download or upload content data; and
an evolved Node B (eNB), wherein the eNB comprises:
a receiver, configured to receive a client request for requesting content data from the UE; and
a processor, configured to:
check a segment map according to the client request; wherein the segment map is configured to store index information of the content data which is divided into a plurality of segments; the segments are distributed in a plurality of eNBs of a Radio Access Network (RAN);
acquire the plurality of segments from the plurality of eNBs of the RAN according to the index information in the segment map; and
generate the content data by using the plurality of segments; and
a transmitter, configured to send the content data to the UE.

15. The communication system as claimed in claim 14, wherein the eNB is further configured to maintain a segment map which stores index information of the content data.

* * * * *